(12) United States Patent
Walker et al.

(10) Patent No.: US 11,991,316 B2
(45) Date of Patent: May 21, 2024

(54) CALL ROUTING IN A COMMUNICATIONS NETWORK

(71) Applicant: BRITISH TELECOMMUNICATIONS PUBLIC LIMITED COMPANY, London (GB)

(72) Inventors: Joanne Walker, London (GB); Robert Claxton, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 77 days.

(21) Appl. No.: 17/613,243

(22) PCT Filed: Apr. 30, 2020

(86) PCT No.: PCT/EP2020/062124
§ 371 (c)(1),
(2) Date: Nov. 22, 2021

(87) PCT Pub. No.: WO2020/239358
PCT Pub. Date: Dec. 3, 2020

(65) Prior Publication Data
US 2022/0224797 A1 Jul. 14, 2022

(30) Foreign Application Priority Data
May 24, 2019 (EP) ..................... 19176597

(51) Int. Cl.
*H04M 7/00* (2006.01)
*H04M 3/533* (2006.01)
(52) U.S. Cl.
CPC ............. *H04M 7/00* (2013.01); *H04M 3/533* (2013.01); *H04M 2203/15* (2013.01)
(58) Field of Classification Search
None
See application file for complete search history.

(56) References Cited

U.S. PATENT DOCUMENTS

| 9,560,198 B2 | 1/2017 | Farrand et al. |
| 9,648,163 B2 | 5/2017 | Pfeffer et al. |

(Continued)

FOREIGN PATENT DOCUMENTS

| CN | 107733900 | 2/2018 |
| CN | 108366173 | 8/2018 |

(Continued)

OTHER PUBLICATIONS

International Search Report and Written Opinion of the ISA for PCT/EP2020/062124, dated Jul. 7, 2020, 11 pages.

(Continued)

*Primary Examiner* — Quynh H Nguyen
(74) *Attorney, Agent, or Firm* — Nixon & Vanderhye, P.C.

(57) ABSTRACT

There is provided a mechanism that allows automated calls made from a set of one or more numbers to be detected and routed in an appropriate manner. The calls are classified based, at least in part, on one or more features of a call frequency time series that is generated from data representing a plurality of calls previously made from a set of one or more numbers by determining a respective number of calls made by the set of numbers during each of a plurality of time intervals. The classification indicates whether the calls include automated calls. Further calls from the set of numbers are routed in accordance with the classification.

17 Claims, 5 Drawing Sheets

(56) References Cited

U.S. PATENT DOCUMENTS

| | | |
|---|---|---|
| 10,135,858 B1 | 11/2018 | Shaw et al. |
| 2006/0291641 A1 | 12/2006 | Barclay et al. |
| 2010/0278325 A1 | 11/2010 | Singh et al. |
| 2015/0003600 A1 | 1/2015 | Bucko |
| 2015/0189082 A1 | 7/2015 | Pfeffer et al. |
| 2016/0036991 A1 | 2/2016 | Brewer et al. |
| 2018/0284313 A1* | 10/2018 | Hu .......................... G06F 18/22 |
| 2019/0116258 A1 | 4/2019 | Gallagher et al. |

FOREIGN PATENT DOCUMENTS

| | | |
|---|---|---|
| GB | 2 425 913 | 11/2006 |
| GB | 2560961 | 10/2018 |
| WO | 2016/197646 | 12/2016 |

OTHER PUBLICATIONS

Shin et al., "Progressive Multi Gray-Leveling: A Voice Spam Proteciton Algorithm", IEEE Network, 7 pages, 2006.

"SIP Analytics in action", TransNexus, retrieved Feb. 28, 2019, 2 pages.

Wang et al., "Voice spam detecting technique based on user behavior pattern model", IEEE, 2012, 5 pages, Nov. 22, 2023.

Chappetta et al., "An anomaly-based approach to the analysis of the social behaviour VoIP users", The International Journal of Computer and Telecommunications Networking, 57 (2013), 1545-1559, Feb. 2013, 15 pages.

Combined Search and Examination Report for GB1705110.3, 7 pages, dated Aug. 21, 2017.

Search Report for EP 19176597.3 dated Oct. 8, 2019, 8 pages.

Extended European Search Report issed for EP17163914.9, 8 pages, dated Sep. 20, 2017.

Combined Search and Exam Report for GB 1907402.0 dated Nov. 21, 2019, 5 pages.

International Preliminary Examination Report issued for PCT/EP2018/058458, completed Feb. 28, 2019, 6 pages.

International Search Report issued for PCT/EP2018/058458, dated Feb. 28, 2019, 3 pages.

Notification of Grant dated Sep. 14, 2021 issued for GB 1907402.0, 2 pages.

Notification of Transmittal of the International Search Report and the Written Opinion of the International Searching Authority, or the Declaration for PCT/EP2020/062124, dated Jul. 7, 2020, 11 pages.

Toyoda et al., "SPIT Callers Detection with Unsupervised Random Forests Classifier", 2013 IEEE International Conference on Communications, Jun. 9-13, 2013, pp. 2068-2072, 5 pages.

Vaz De Melo et al., "Surprising Patterns for the Call Duration Distribution of Mobile Phone Users", ECML PKDD'10 Proceedings of the 2010 European conference on Machine learning and knowledge discovery in databases: Part III, pp. 354-369, Sep. 20-24, 2010, 16 pages.

Waiting et al., "A Multilayered Architecture for Preventing Automated Spam in the IP Multimedia Subsystem", IEEE Globecom 2007—IEEE Global Telecommunications Conference, Nov. 26-30, 2007, pp. 2140-2145.

Written Opinion of the International Searching Authority issued for PCT/EP2018/058458 dated Nov. 22, 2021.

Examination Report dated Feb. 8, 2023, issued for European Application No. 20 721 264.8 (7 pages).

International Preliminary Report on Patentability for PCT/EP2020/062124 dated Dec. 2, 2021 (8 pages).

* cited by examiner

… (1)

CALL ROUTING IN A COMMUNICATIONS NETWORK

This application is the U.S. national phase of International Application No. PCT/EP2020/062124 filed 30 Apr. 2020, which designated the U.S. and claims priority to EP Patent Application No. 19176597.3 filed 24 May 2019, the entire contents of each of which are hereby incorporated by reference.

FIELD OF THE INVENTION

The present invention relates to a method of routing calls in a communications network, and in particular to a method of routing calls by classifying a plurality of telephone calls made from a set of one or more numbers to indicate whether those calls include automated calls.

BACKGROUND TO THE INVENTION

Automated telephone calls have become problematic for many users and it is known to use telephone answering machines or systems to block calls which are from unidentified numbers, which are from numbers held in a blacklist (or alternatively are not present on a whitelist), or which are from numbers of a particular category (for example international calls). An example of such a system is disclosed in GB2425913. However, it would be preferable if such calls could be blocked within the operator's networks, such that the customer does not need to take significant action or acquire specific equipment in order to not be disturbed by the automated calls.

Automated telephone calls are calls which are initiated by a computer dialler (or robot dialler or automatic dialler) as opposed to human-generated calls which are dialled (or otherwise initiated) by a human operator. In some cases, when an automated call is answered by a called party, the computer dialler will play a pre-recorded message to the called party. In other cases, the computer dialler will connect the called party to a human operator (or agent) once the automated telephone call has been answered. These approaches are also combined in some cases, with the computer dialler playing a pre-recorded message and then connecting the call to a human operator. It will be understood that a bank of computer diallers can generate a significant number of calls within a limited period of time.

SUMMARY OF THE INVENTION

It is therefore desirable to provide a mechanism that allows automated calls to be detected and routed in an appropriate manner.

According to a first aspect of the invention, there is provided a method of routing calls in a communications network, the method comprising: obtaining data representing a plurality of calls previously made from a set of one or more numbers; generating a call frequency time series for the set of numbers from the data by determining a respective number of calls made from the set of numbers during each of a plurality of time intervals; classifying the plurality of calls based, at least in part, on one or more features of the call frequency time series, the classification indicating whether the plurality of calls from the set of numbers includes automated calls; routing further calls from the set of numbers in accordance with the classification of the plurality of calls.

The set of numbers may comprise a plurality of numbers.

The one or more features may be derived from one or more characteristic variations in call frequency over time and, optionally, may comprise one, or both, of: transitions from quiet periods to busy periods; and transitions from busy periods to quiet periods, wherein an average number of during time intervals within a quiet period is lower than an average number of calls during time intervals within a busy period. The classification may be based, at least in part, on the durations of the transitions.

A sliding window detector may be used to generate a respective measure of similarity between each of a plurality of windowed portions of the call frequency time series and one or more detector functions representing the one or more features. The measure of similarity may comprise the Mahalanobis distance, wherein a low Mahalanobis distance indicates a high measure of similarity and a high Mahalanobis distance indicates a low measure of similarity. The one or more detector functions may comprise one or both of: a step function which transitions from a low state to a high state, the step function representing a transition from a quiet period to a busy period; and a step function which transitions from a high state to a low state, the step function representing a transition from a busy period to a quiet period. The classification of the plurality of calls is based, at least in part, on an average of the respective measures of similarity for any windows having a measure of similarity that is higher than a predetermined threshold. Classifying the plurality of calls may comprise classifying the plurality of calls as automated calls if the average is above a predetermined threshold.

The method may further comprise determining a number of occurrences of the one or more features in the call frequency time series during a predetermined time period and the classification may be based, at least in part, on the number of occurrences of the one or more features.

The method may further comprise identifying a respective time associated with each occurrence of the one or more features and the classification may be based, at least in part, on the times at which the one or more features of the call frequency time series occurred.

Routing further calls from the set of numbers in accordance with the classification of the plurality of calls may comprise: delivering the further calls to a voicemail server if the plurality of calls are classified as automated calls; and delivering the further calls to the original called number if the plurality of calls are not classified as automated calls.

According to a second aspect of the invention, there is provided a computer system comprising a processor and a memory storing computer program code for performing the method set out above.

According to a third aspect of the invention, there is provided a computer program which, when executed by one or more processors, is arranged to carry out the method set out above.

According to a fourth aspect of the invention, there is provided a call management device for use in a communications network, the call management device being configured to: obtain a classification of one or more lines as carrying automated call attempts, the classification being derived in dependence upon a call frequency time series representative of a variation in the frequency of calls made from the set of one or more lines; and prevent a call attempt received on one of the one or more lines from being routed to a destination indicated by the call attempt.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
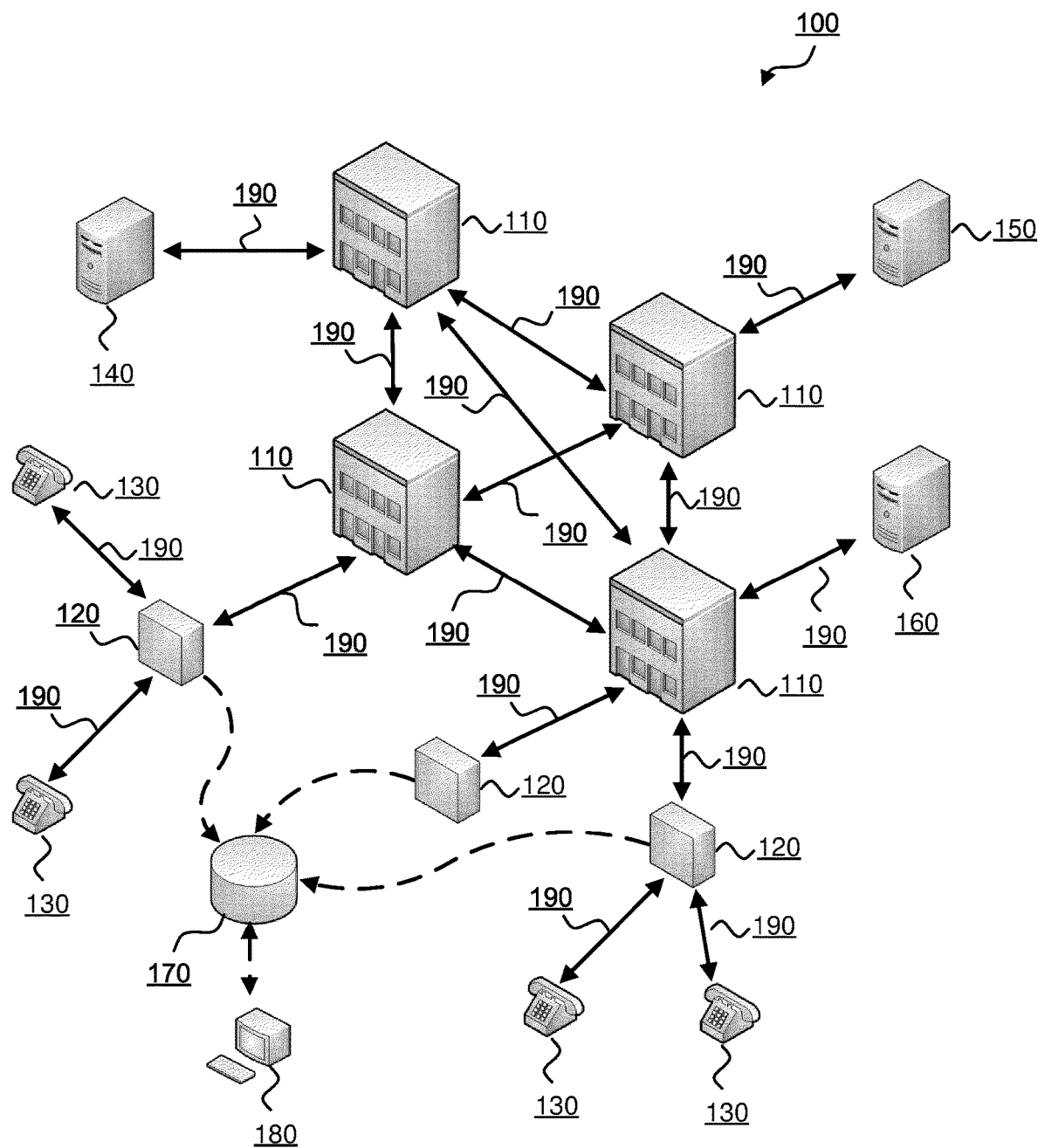
FIG. 1 is a schematic depiction of an exemplary telephone network within which embodiments of the invention may operate.

FIG. 1 is a schematic depiction of an exemplary telephone network 100 within which embodiments of the invention may operate. The exemplary telephone network 100 is a conventional telephone network comprising a plurality of core exchanges 110, a plurality of local exchanges 120, a plurality of customer telephony terminals 130, one or more domestic gateways 140, one or more international gateways 150, one or more voicemail servers 160, one or more call data stores 170 and one or more analyst terminals 180.

The core exchanges 110 are interconnected by a plurality of communications links 190. Each of the plurality of core exchanges 110 are further connected to one or more local exchanges by further communications links 190 (although, for the sake of clarity, not all of the core exchanges 110 illustrated in FIG. 1 are shown as being connected to local exchanges 120).

The local exchanges 120 are each connected to a respective core exchange 110 via a respective communication link 190. Each of the local exchanges 120 is also connected to a respective subset of the customer telephony terminals 130 via yet further communications links 190 (although again, for the sake of clarity, this is not shown for each of the local exchanges 120 in FIG. 1).

The customer telephony terminals 130 are each connected to a respective local exchange 120 via a respective communication link 190. The customer telephony terminals 130 can include devices such as telephones, private branch exchanges (PBX), conference phones, computer diallers, fax machines, modems, answering machines and so on.

The domestic gateways 140 are each connected to one or more other telephony networks (not shown) in the same country. The domestic gateways 140 enable calls to be routed between the telephone network 100 and the other telephony networks. That is to say, the domestic gateways 140 enable the customer telephony terminals 130 within the telephone network 100 to place calls to and/or receive calls from telephony terminals within the other telephony networks.

The international gateways 150 are each connected to one or more other international telephony networks (not shown). The international gateways 150 enable calls to be routed between the telephone network 100 and the other international telephony networks. That is to say, the international gateways 150 enable the customer telephony terminals 130 within the telephone network 100 to place calls to and/or receive calls from telephony terminals within the other international telephony networks.

The voicemail servers 160 are connected to the telephone network 100 via respective communications links 190. They may be connected at any point in the telephone network 100, such as at core exchange 110 as shown in FIG. 1. Although not illustrated in FIG. 1, voicemail servers 160 may also or alternatively be connected to a local exchange 120. Each of the voicemail servers 160 provides a voicemail facility to a plurality of customers of the telephone network 100. For example, a voicemail server 160 connected to a local exchange 120 might provide a voicemail facility for the customers whose telephony terminals 130 are directly connected to that local exchange 120. Of course it will be appreciated that a multitude of other arrangements are possible.

The call data stores 170 each store a plurality of call data records representing some or all of the telephony calls made over the telephone network 100 for a given period of time. Each call data record will comprise the telephone number used by the calling party, the telephone number of the called party, the time that the call started and the time that the call was terminated (or a time that the call started or ended and a duration of the call). The call data is provided periodically to the data stores by the one or more local exchanges 120 (and/or, in some embodiments, by the core exchanges 110) as calls are placed, connected and terminated in the telephone network 100. The provision of the call data is provided to the data stores 170 using any appropriate means of communication, such as by using a data network that is separate from the telephone network 100. As will be appreciated, each data store, may receive data from different sets of local exchanges 170, such that call data for the network 100 as a whole is spread across the data stores 170.

The analyst terminals 180 are computer systems which a can access the data stored in the data stores 170 (or, at least, in some of the data stores 170). Programs may run on the analyst terminals 180 to analyse the call data stored in the data stores 170 including, for example, to classify whether particular callers are a source of automated telephone calls, in accordance with embodiments of this invention.

As is well known, calls made by a customer telephony terminal 130 are initially handled by the local exchange 120 to which the terminal 130 is connected via its respective communication link 150. If the destination of the call is another terminal 130 that is connected to the same local exchange 120, that local exchange 120 can route the call directly to its destination without involving any of the other components of the telephone network 100. Otherwise, if the destination terminal 130 is not on the same local exchange 120, the local exchange 120 routes the call to the respective core exchange 110 to which it is connected to handle the further routing of the call. If the call is destined for another terminal 130 on the network, the core exchange 110 routes the call, possibly via one of the other core exchanges 110, to the local exchange 120 to which that terminal 130 is connected. However, if the call is destined for a terminal on another network, the core exchange 110 routes the call to one of gateways for onward routing to that network. In some cases, instead of routing a call to a customer's telephony terminal 160, the telephone network 100 can instead route a call to one of the voicemail servers 160 which provides a voicemail facility for that customer. The caller can then leave a message which will be recorded by the voicemail server 160 and can later be replayed by the customer at a time convenient to them. If a call is routed to the voicemail a notification such as a computer or smartphone notification, an SMS message and/or an email will be sent to the customer informing them of the presence of an unheard voicemail on the voicemail server 160. The decision to route a call to one of the voicemail servers 160 may be made if, for example, there is no answer from the customer's telephony terminal 160 after a predetermined number of rings or if a customer has specified that all calls should be redirected to their voicemail.

It will be understood that the telephone network 100 illustrated in FIG. 1 is merely exemplary and that various modifications may be made according to the needs of a specific telephone network. In some embodiments, various components described above may be absent from the telephone network 100. For example, the network may not include domestic gateways 140 and/or international gateways 150 if such connectivity to other networks is not required. Similar, the telephone network 100 may not include voicemail servers 160 if no voicemail service is offered to customers of the network. Furthermore, a wide range of other components not illustrated in FIG. 1 may be present in the telephone network 100. Indeed, in general, it will be appreciated that there are many different forms that telephone network 100 may take using different combinations, numbers, types and arrangements of these components.

Figure 2:
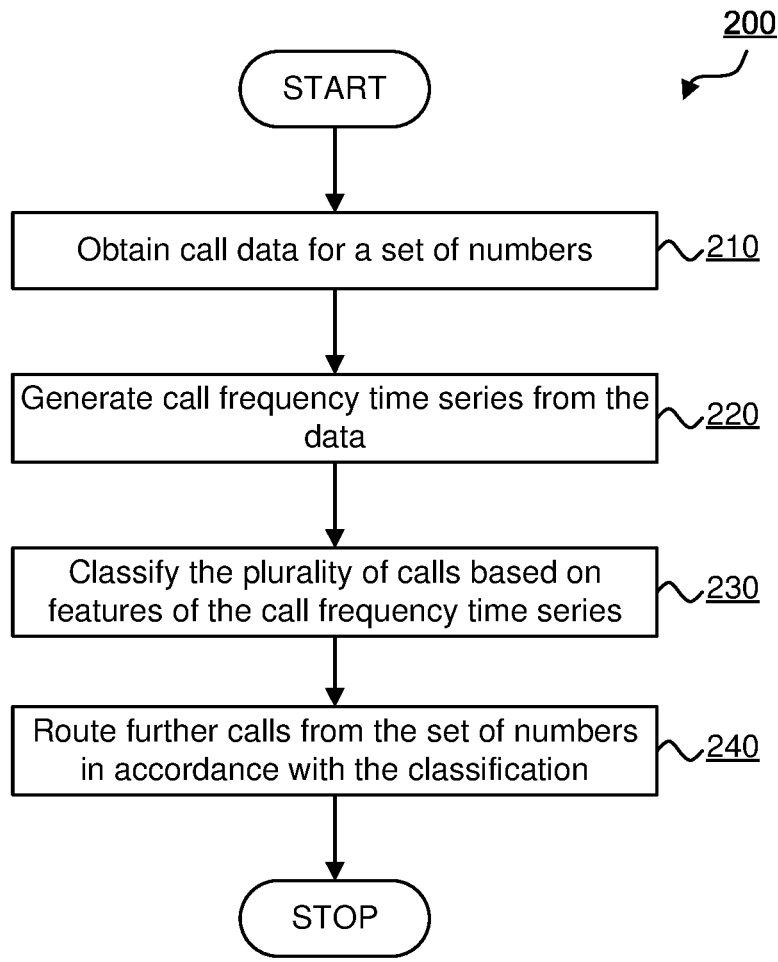
FIG. 2 shows a flowchart describing how a method according to the present invention can be implemented.

FIG. 2 shows a flowchart describing how a method 200 according to the present invention can be implemented. The method 200 starts with an operation 210.

At operation 210, the method 200 obtains call data for a set of numbers. The selection of the set of telephone numbers to be analysed can be done in any appropriate manner. In some cases, an analyst terminal 180 performing the method 200 may simply try different combinations of numbers in sets that are randomly or methodically chosen. In other cases, other factors may be used to help guide the selection of sets of telephone numbers to be analysed. For example, where telephone numbers for which complaints have been received indicating that (unwanted) automated calls are being made from particular telephone numbers, those telephone numbers may be prioritised for analysis. Similarly, other features of the calls from particular telephone numbers, such as average durations, or variations in average durations, may be used to help prioritise different telephone numbers as being candidates to be analysed. Similarly, numbers belonging to entities which are known to be making large numbers of automated calls in a responsible manner for genuine purposes may be added to a whitelist. Numbers on the whitelist may not be included in any of the sets of telephone numbers selected for analysis.

The call data for the set of numbers represents a plurality of calls that have previously been made from the set of numbers during a preceding time period. In an example, the call data represents calls made during the previous 24 hours. However, it will be appreciated that the call data may cover any desired time period, whether greater or smaller than this. The call data need not necessarily contain all of the calls that might have been made by the set of numbers during the preceding time period. Indeed, where some or all of the calls from telephone numbers in the set of numbers originate from another network this may not be available (especially for calls to telephone numbers that are also in other networks). Nonetheless, it is preferable to obtain as much call data for the set of numbers during that time period as possible in order to improve the classification that is provided by this method. The call data is retrieved from one or more, or all, of the call data stores 170. Having obtained the call data, the method 200 proceeds to an operation 220.

At operation 220, the method 200 generates a call frequency time series from the call data. The call frequency time series is generated by using the call data to determine a respective number of calls made from the set of numbers during each of a plurality of time intervals.

Figure 3A:
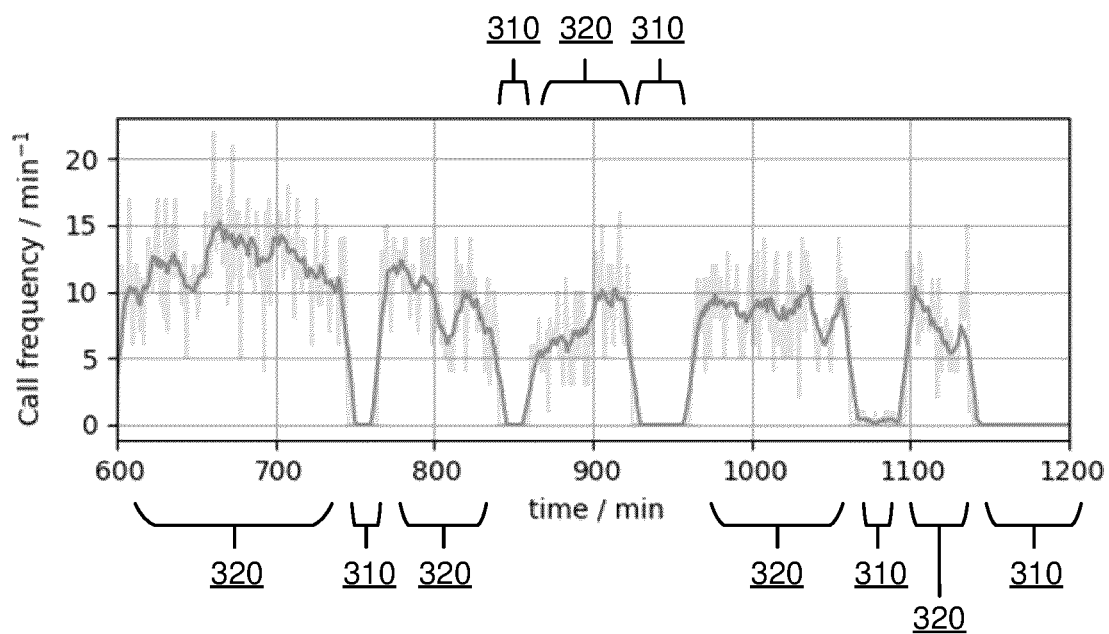
FIG. 3A is a chart illustrating an exemplary call frequency time series generated from call data for a set of numbers in which a computer dialler has been in operation.
Figure 3B:
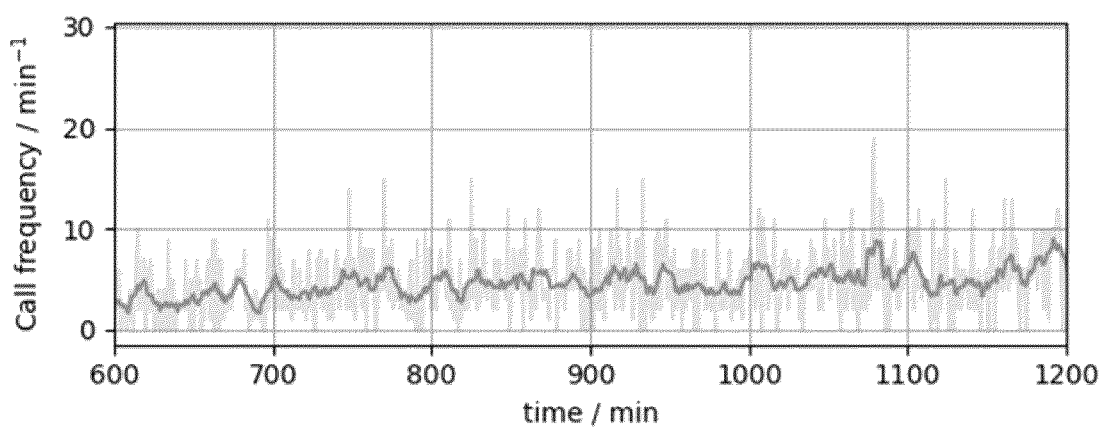
FIG. 3B is a chart illustrating an exemplary call frequency time series generated from call data for a set of numbers from which only human-generated calls originated.

FIGS. 3A and 3B show a charts illustrating two exemplary call frequency time series generated for two different sets of numbers. Both of these call frequency time series were generated with a temporal resolution of 1 minute (i.e. by counting the calls made during 1 minute time intervals). However, it will be appreciated that any other suitable time interval, whether greater or less than 1 minute, may be used instead, provided it gives sufficient temporal resolution to allow various features to be represented, as discussed further below. Preferably, the time interval is in the range of between 10 seconds and 10 minutes, so as to provide a suitably granular temporal resolution to enable various features of the call frequency time series to be detected. However, in some embodiments, the time interval that is used may fall outside of this range. Generating a call frequency time series with a temporal resolution of 1 minute results in a time series having 1440 call frequency data points over a period of 24 hours, with each data point corresponding to the number of calls that are made in the corresponding minute of the day from the set of numbers under consideration. Although again, the time series may cover a period shorter or longer than 24 hours. For example, the time series shown in FIGS. 3A and 3B cover a period of 10 hours.

In the call frequency time series shown in FIGS. 3A and 3B, the number of calls in each time interval was calculated by counting the number of calls that were initiated during that time interval. Accordingly, any calls that were initiated in a previous time interval that are still ongoing in a subsequent time interval are ignored when determining the number of calls for the subsequent time interval. However, other methods of calculating the number of calls for each time interval may be used instead. For example, the total number of calls that are in progress during each time interval, including any that were initiated in a previous time interval, can be counted. Alternatively, as a further example, the total number of calls that were terminated during the time interval, including any calls that were initiated in a previous time interval but ignoring any calls that were still ongoing after the time interval, may be counted instead. In general, regardless of how the number of calls for a given time interval is counted, the call frequency provides a measure of the level of activity of the set of numbers during each time interval. Accordingly, the call frequency time series allows changes in the level of activity of the set of numbers during the time period to be analysed.

In some embodiments, the generated time series is filtered prior to further use using a low-pass filter. This filtering may help to reduce the level of noise that may be present in the time series. In the call frequency time series shown in FIGS. 3A and 3B, the unfiltered time series being shown with a lighter line and the filtered time series is shown with a darker line. The filtering performed in this case was to apply a 10 min moving average throughout the time series. However, any other suitable time frame or filtering technique may be used instead, as will be known to those skilled in the art.

Having generated the call frequency time series, the method 200 proceeds to an operation 230.

At operation 230, the method 200 classifies the calls from the set of numbers based on features of the call frequency time series (although the classification may also be based on other factors as well). The classification indicates whether the plurality of calls includes automated calls (or not). That is to say, the classification indicates whether a computer dialler is involved in placing calls from the set of numbers under consideration.

It can be difficult to detect computer dialler operation within a telephone network 100. For example, although high call volumes are often a signature of automated calls and can be used to detect the operation of a computer dialler, it is possible to evade in-network detection based on call volume threshold tests by spreading out the calls over multiple different numbers such that the calls from each number individually do not exceed the threshold.

Nonetheless, it has been realised, that the call frequency time series can be used to detect computer diallers even in the face of such issues. Specifically, a computer dialler will typically cycle through distinct periods of activity levels. This results in distinctive temporal variations in the call frequency data providing features within the call frequency time series that can be used to detect the computer dialler. In particular, the typical operation of a computer dialler tends to cycle through four distinctive periods (or phases), as follows:

Firstly, the computer dialler starts off in an inactive state (e.g. where it is switched off). In this period, which will be referred to as a quiet (or dormant) period 310, the call volume is likely to be relatively low. That is to say, the call volume is likely to be zero or close to zero (at least relative to call volumes during other periods). It is possible that some human-generated traffic may still be placed using the numbers, meaning that the call volume may not be absolutely zero. However, this human-generated traffic is likely to pale into insignificance compared to automated calls generated in later periods.

Next, when the computer dialler initially enters an active state (e.g. where it is switched on), the call frequency increases from the relatively low level during the quiet period until it reaches a higher level of call frequency when the computer dialler is in full operation. The period over which this transition, which will be referred to as a ramp-up transition (or phase), occurs is typically very short and generally occurs over the course of several minutes. It is also observed that there is a further difference that can generally be expected to occur between the ramp-up transition that occurs for a caller that is using a computer dialler to place legitimate calls and that which occurs for a caller that is using a computer dialler to place nuisance calls. In particular, a computer dialler placing legitimate calls will typically require a "warm-up" phase in which the dialler learns the characteristics of the operators that are handling calls. This is needed in order to eliminate (or at least reduce) the risk of the dialler placing a call for which no operator is available to handle if the call were to be answered, which may result in a so-called "silent call". The difficulty of this task may be increased for legitimate callers as the variance in call duration may be expected to be much greater than for automated nuisance calls. Legitimate callers are typically keen to avoid these "silent calls" being placed. Therefore, the volume of calls placed by the computer dialler that is being used to make legitimate calls will slowly increase during this "warm-up" phase to minimise the risk of placing "silent calls". This is in contrast to computer diallers which are being used to make nuisance calls as such operators are typically not concerned with the issue of "silent" calls. Therefore computer diallers which are being used to make nuisance calls typically do not make use such a long "warm-up" period and so reach a peak call volume much quicker.

Next, with the computer dialler active and in full operation, a high level of calls are placed resulting in a period within the call frequency time series which varies noisily about an elevated and sustained mean value. This will be referred to as a busy (or peak) period 320. Again, a further difference can generally be expected to occur between the peak period that is reached by a computer dialler being used to place legitimate calls and one that is used to make nuisance calls. In particular, legitimate calls (where an operator is involved) may be expected to take longer on average and be more varied in their duration. Additionally, these characteristics may be expected to vary more throughout the day due to the variation in willingness for people to engage with the legitimate calls at different times of day. As a result, the peak period for legitimate calls made by a computer dialler typically tend to start off at a high level and decrease slightly with time as some calls end and there is a delay in connecting subsequent calls whilst other calls are being sustained. This effect can be more pronounced at times of the day when people are more willing to engage with legitimate automated calls, such as in the afternoon. In any case, in general, these characteristics of legitimate calls also means that the peak period for a computer dialler placing legitimate calls may typically be expected to be lower, noisier and flatter (or more consistent) than the peak period for a computer dialler placing nuisance calls.

Finally, when the computer dialler re-enters an inactive state (e.g. where it is shut down), the call frequency decreases from the higher level of call frequency of the busy period back down to a relatively low level of another quiet period. The period over which this transition, which will be referred to as a ramp-down transition (or phase), occurs is again typically very short and generally occurs over the course of several minutes. A further difference can generally be expected to occur between the ramp-down transition for a computer dialler that is being used to place legitimate calls and one that is used to make nuisance calls. Specifically, due to the average length and variance in duration for legitimate calls typically being greater, the ramp-down transition for a computer dialler placing legitimate calls may occur over a greater period of time than that for a computer dialler placing nuisance calls as the remaining legitimate calls that are in progress at the end of the computer diallers operation take longer to reach a conclusion.

This cycle tends to be repeated several times over the course of a given day for a typical computer dialler. It is thought that this is typically due to the computer dialler either being turned on and off or otherwise failing and recovering. This typically yields multiple quiet periods during a day which may correspond to a failure of the computer dialler, with a ramp-up transition back up to a busy period when the computer dialler recovers from the failure. Accordingly, where a computer dialler is present, the call frequency time series may contain multiple quiet periods, multiple busy periods and multiple ramp-up and ramp-down transitions between the quiet periods and the busy periods. Of course, the frequency of calls and durations of the transitions may vary between each occurrence (or instance) of these periods. Nonetheless the distinctive features provided by the activity levels at different points in the time series are indicative of the presence of a computer dialler.

Returning to the time series illustrated in FIG. 3A, which was generated from call data for numbers in which a computer dialler has been in operation, it can be seen that the quiet periods 310 and the busy periods 320 are readily apparent. It can also be seen that the transitions between the quiet periods 310 and the busy periods 320 (and vice versa) are abrupt and occur within a relatively short period of time.

Whilst not all computer diallers necessarily follow this pattern, where this pattern is observed (that is where the activity levels occurring at different points in the time series correspond to the characteristic features of a computer dialler), it is likely that the calls have been generated via a computer dialler rather than being human-generated.

In contrast, sudden changes in the observed call frequency, such as caused by failures resulting in a sudden ramp-down transition to a quiet period followed by a ramp-up transition back up to a busy period for a computer dialler, are not generally observed for human-generated traffic. Conversely, changes in call frequency for human-generated call traffic tends to occur gradually over much over longer time scales than these ramp-up and ramp-down transitions of computer diallers. This distinction is readily apparent by comparing the time series illustrated in FIG. 3A with that illustrated in FIG. 3B which was generated from call data for numbers from which only human-generated calls originated (i.e. where no computer dialler was operational).

Furthermore, the call frequency of human-generated call traffic tends to vary to a greater extent over time compared to the call frequency of the automated calls placed by a computer dialler operating during a busy period. Specifically, the call traffic generated by the computer dialler will tend to have an approximately flat call frequency signature in the busy period of operation (particularly where the call simply involves playing a pre-recorded message).

It will be appreciated that there are many different ways that these distinctive features can be identified. Quiet periods, for example, may be identified by searching through the time series for any periods in which an average call frequency is low or zero (such as by being below a particular predetermined threshold). Busy periods of the time series may be identified by searching for any periods in which an average call frequency is high. For example, another predetermined threshold can be specified and any periods which have an average call frequency above that predetermined threshold can be identified as being busy periods. Additionally, a further predetermined threshold can be specified to limit the variance of the call frequencies in a busy period to ensure that only those periods where the call frequency is relatively stable are identified as busy periods. Naturally, the ramp-up and ramp-down transitions may be identified as the periods between any identified quiet and busy periods.

However, as will be discussed further below, other techniques for classifying the calls based on the features of the time series need not necessarily explicitly identify the features in the time series.

Similarly, it will be appreciated that there are many different ways that the features of the call frequency time series can be used to classify the calls. As will be discussed further below, some of these techniques need not necessarily involve the explicit identification of the features of the time series. It is also not necessary for all of the features to be identified in order for the calls to be classified—in some embodiments a subset of the features, such as one or more of the features, may be used. However, in other embodiments, all of the features may be used in the classification of the calls.

As an example, a number of occurrences of the one or more features (e.g. one or more of quiet periods, ramp-up transitions, busy periods, ramp-down transitions) during a particular predetermined time period can be used to classify the calls. In particular, it is believed that the more transitions that are made (and therefore, by extension, also the number of quiet periods and/or busy periods) in a given time period, the more likely it is that a computer dialler is making automated calls from the number. Therefore, in some embodiments, the calls may be classified as automated calls if the number of occurrences of one or more of the features exceeds a predetermined threshold within a given time period (such as 24 hours, for example). However, in other embodiments, this number of occurrences may be used as one component upon which the classification is made (such as, for example, being inputs to a neural network trained to classify the calls whereby the neural network may consider other inputs as well).

As another example, the time at which each occurrence of the one or more features may be identified (such as the times of the ramp-up and/or ramp down transitions which correspond to the computer dialler being switched on and/or off). The times at which the one or more features occurred in the call frequency time series may then be used to classify the calls. Alternatively, these times may be provided as one component upon which the classification is made.

As yet another example, where the one or more features include ramp-up transitions (transitions from a quiet period to a busy period) or ramp-down transitions (transitions from a busy period to a quiet period), or both, the classification may be based on the durations of those transitions. As discussed above, these transitions are typically relatively short where the calls are being placed by a computer dialler. As an example of how the transition durations might be used, an average of the transition durations may be calculated and the calls may be classified as including automated calls made by a computer dialler if the average transition duration is less than a certain predetermined threshold (in some embodiments, a predetermined threshold of 10 minutes may be used, although of course other thresholds may be used instead). Where both ramp-up and ramp-down transitions are considered, these may be considered together (for example by calculating a single average transition duration of both types of transition) or separately (for example by calculating an average transition duration for each type of transition and comparing this to a respective predetermined threshold). Alternatively, these transition durations may be provided as one component upon which the classification is made (such as, for example, being inputs to a neural network trained to classify the calls whereby the neural network may consider other inputs as well).

Although there are many different ways of classifying the calls based on the features of the call frequency time series, one particular method will now be discussed. The method involves using a sliding window detector to detect the features of the time series. The sliding window detector compares a window of the time series to one or more detector functions. The window covers a portion of the call frequency time series comprising a predetermined number of sequential time intervals. The portion of the call frequency time series covered by a particular window may be referred to as the windowed portion (or windowed block or windowed section) of the time series. The detector functions each represent a respective one of the one or more features being detected over the same number of time intervals. By comparing the call frequency values at each of the time intervals within the windows to the values of the detector functions at the corresponding time intervals, a respective measure of similarity can be generated between the detector function and that window (or portion) of the call frequency time series. If the measure of similarity indicates that the window of the time series is similar to one of the detector functions, it can be considered that the feature represented by the detector function is present in the portion of the time series covered by that window. Meanwhile, if the measure of similarity indicates that the window of the call frequency time series is dissimilar to the detector functions, it can be considered that the features represented by the detector functions are not present in that portion of the time series. Therefore, as the window is moved (or slid) across the call frequency time series, a sequence of similarity measures are generated, indicating whether the features represented by the functions are present in each window.

Figure 4A:
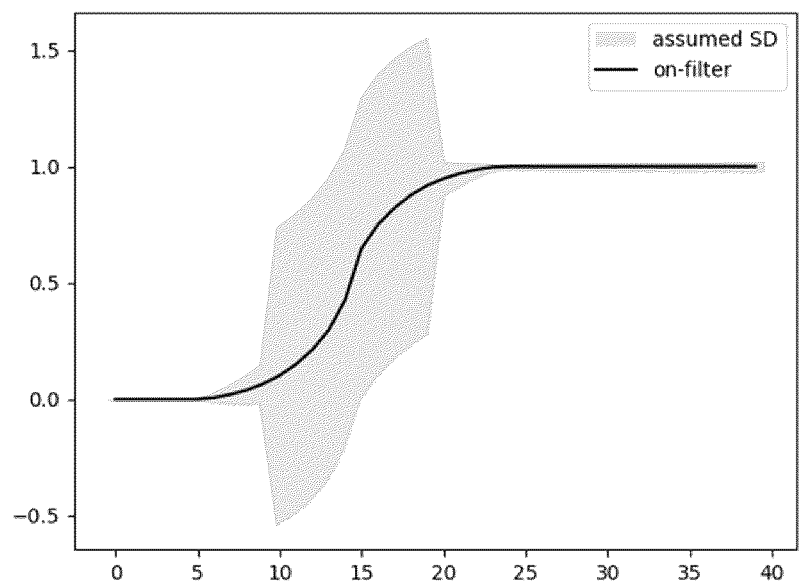
FIG. 4A shows an exemplary detector function for detecting ramp-up transition features of the call frequency time series.
Figure 4B:
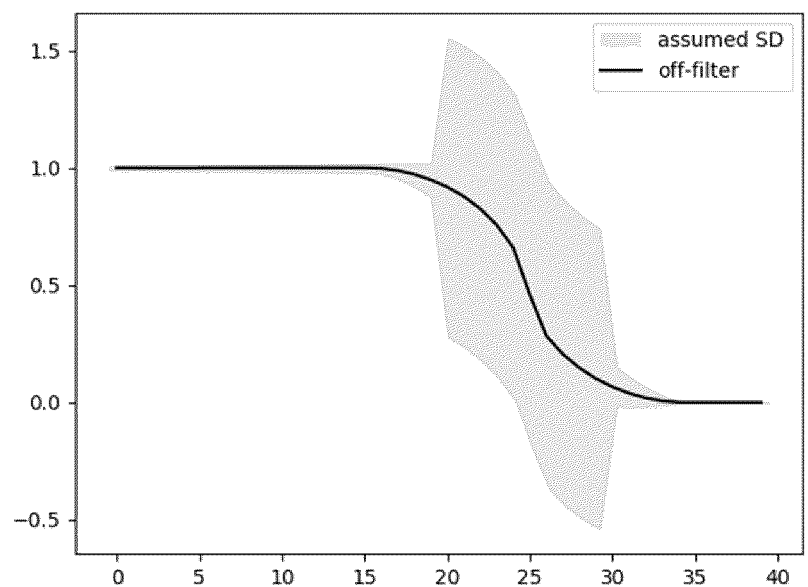
FIG. 4B shows an exemplary detector function for detecting ramp-down transition features of the call frequency time series.

FIGS. 4A and 4B show exemplary detector functions. FIG. 4A shows an exemplary detector function for detecting ramp-up transition features of the call frequency time series (which may accordingly be referred to as an on-detector). Meanwhile, FIG. 4B shows an exemplary detector function for detecting ramp-down transition features of the call frequency time series (which may accordingly be referred to as an off-detector). Each of these detector functions covers a total of 40 time intervals. This means that the sliding window detector will have a window size of 40 when using either (or both) of these exemplary detector functions. Of course, in other embodiments, detector functions covering a different number of time intervals may be used resulting in a different window size.

Given a particular window size (n), and a particular number of time intervals (p) covered by the call frequency time series, the total number of window positions is given by (p-n)+1. A first window position $w_1$ covers intervals $\{t_1, \ldots, t_n\}$ of the time series (i.e. the windowed portion of the time series is $\{t_1, \ldots, t_n\}$). The next window position $w_2$ covers intervals $\{t_2, \ldots, t_{n+1}\}$ of the time series (i.e. the windowed portion of the time series is $\{t_2, \ldots, t_{n+1}\}$).

Incrementing the start and end positions of the window yields each subsequent window position until a final window position $w_{(i-n)+2}$ which covers intervals $\{t_{(p-n)+1}, \ldots, t_p\}$ of the time series. The call frequencies at each of the time intervals within a given window is compared to the value of the detector function at the corresponding time interval. For example, the first call frequency value in a window is compared to the first value of the detector function, the second call frequency in the window is compared to the second value of the detector function and so on. Therefore, as the window is slid across the call frequency time series, each time interval in the call frequency time series is compared to different time intervals of the detector function (i.e. in the first window position $w_1$, the time interval $t_n$ of the time series is compared to the last element $f_n$ of the detector function, whilst in the $n^{th}$ window position, the time interval $t_n$ of the time series is compared to the first element $f_1$ of the detector function). Of course it will be appreciated that, in some embodiments, the detector function may be compared to a subset of the possible window positions such that a measure of similarity is not calculated for every possible window position, but only for some of them. This may help reduce the amount of computation required, albeit at the expense of a loss of temporal resolution.

Although the detector functions illustrated in FIGS. 4A and 4B take the form of step functions for detecting the ramp-up and ramp-down transition features of the call frequency time series respectively, it will be appreciated that other detector functions could be used for detecting other features indicative of a computer dialler's operation. For example, a flat line at y=1 could be used for detecting busy periods of the call frequency time series. Similarly, a flat line at y=0 could be used for detecting quiet periods of the call frequency time series. Additionally, it will be appreciated that the step function used, need not be exactly square in form and other functions which approximate a step function and represent a reasonably brief transition from a high-level to a low-level (or vice-versa) may be used.

In some embodiments, the call frequency time series are normalised prior to use with the sliding window detector. This normalisation scales the values of the time series such that they fall within some predetermined range (such as between 0 and 1). This normalisation enables a standard detector function to be created that lies within the same predetermined range (for example, the values of the detector functions shown in FIGS. 4A and 4B lie within the range between 0 and 1). Through the normalisation of the call frequency time series, the standard detector function can be used regardless of the actual call volumes involved. However, in other embodiments, normalisation need not be used and the detector functions may be scaled to reflect the actual call volumes that are expected—in this case, such a detector function may not detect functions where a volume of calls is different (either lower or higher) than that expected.

Any suitable means for determining a measure of similarity between the one or more detector functions and each of the windows of the time series may be used. In an embodiment, the measure of similarity is determined by calculating the Mahalanobis distance between the detector functions and the various windows of the time series. As will be known, the Mahalanobis distance is the multivariate equivalent of the z-score for a normally distributed measurement given the standard deviation of the distribution. For the univariate case, the z-score is given by:

$$z = \frac{x - \mu}{\sigma}$$

Where z is the distance measure, $\mu$ is the mean of the distribution and $\sigma$ is the standard deviation of the distribution. This determines a distance between the measurement x and the mean $\mu$ standardised by the standard deviation of the distribution $\sigma$. It expresses how many standard deviations a given measurement is away from the mean. The Mahalanobis distance is the multivariate generalisation of this concept.

As applied to this invention, the Mahalanobis distance characterises the distance (or closeness) between the vectors representing the detector function $z_d$ and a window of the call frequency time series $z_{ts}$. The distance is standardised by the covariance term $\Sigma$ assigned to the detector function. This covariance $\Sigma$ is an n×n matrix where n is the number of elements in the detector function (i.e. the window size). The covariance defines the assigned uncertainty (i.e. variance) at each of the n time intervals of the detector function as well as any correlations in the uncertainty between these n points (i.e. covariance). The Mahalanobis distance d (or closeness of fit) between the detector function and the window of the call frequency time series is given by:

$$d = \sqrt{(z_{ts} - z_d)^T \Sigma^{-1} (z_{ts} - z_d)}$$

In general, when the detector and time series vectors are close, the computed Mahalanobis distance will be small (indicating a high measure of similarity). When they are far apart because the sliding detector is misaligned with the features being detected, the Mahalanobis distance is large (indicating a low measure of similarity).

The covariance term $\Sigma$ that is used as part of the calculation of the Mahalanobis distance enables an uncertainty to be assigned to each element of the detector function. This uncertainty can be used to characterise the closeness of fit that is required between the call frequency time series and each point of the detector function. This covariance $\Sigma$ (or uncertainty) is represented by the shaded area in FIGS. 4A and 4B. In general, when the assigned uncertainty represented by the covariance $\Sigma$ is high, the detector is less demanding about closeness of fit between the detector function and the call frequency time series and conversely when the assigned uncertainty is low a better fit is demanded. Accordingly, by adjusting the covariance term $\Sigma$ used in the calculation of the Mahalanobis distance the sliding window detector can defined with different sensitivities for different parts of the detector function in order to meet the expected variance of those features in the call frequency time series.

As can be seen from the shaded area of FIGS. 4A and 4B, the assigned uncertainty for the detector function is higher during the ramp-up and ramp-down transition periods and lower in the quiet and busy periods. Accordingly, the closeness of fit demanded between the detector function and the window of the call frequency time series during the quiet period is very strict so that the detector will yield lower distances (higher similarity scores) for time series which are very close to zero during the quiet period preceding the ramp-up transition (or following the ramp-down transition). Similarly, the closeness of fit demanded between the detector function and the window of the call frequency time series during the busy period is also high, meaning that the detector will yield lower distances (higher similarity scores) for time series which match the form of the detector function and have a flat sustained call frequency in the busy period following the ramp-up transition (or preceding the ramp-down transition). However, the closeness of fit demanded by the detector in the ramp-up and ramp-down phases is less stringent, thereby allowing for differences in the time to reach the peak call-frequency activity of a busy period following a quiet period and vice versa.

In order to generate a detector function and its associated covariance matrix $\Sigma$, an ensemble of candidate features can be assembled from which the detector function and covariance matrix $\Sigma$ can be derived. The ensemble of candidate features contains multiple different candidate features which each represent a different example of the feature (such as a ramp-up or ramp-down transition) that the detector function is to detect. In some embodiments, these candidate features are generated via a hypothesis led approach whereby the ensemble of candidate features are generated via modelling. In other embodiments, these candidate features are generated based on real data. That is to say, the candidate features may be instances of those features occurring in call frequency time series generated from real call data. In either case, a detector function for detecting the function represented by the ensemble of candidate features (such as a ramp-up or ramp-down transition) can be generated based on the average values of the candidate features in the ensemble. In other words, the vector associated with the detector function $z_d$ can simply be the interpreted as an estimate of the mean of the call frequency time series based on the ensemble of candidate features. Similarly, the values of the covariance matrix $\Sigma$ for the detector function can also be generated based on the values of the candidate features in the ensemble (whether generated as part of a hypothesis led approach or based on real call data).

When following a hypothesis led approach, the deviation at each point (i.e. time interval) of the detector function can be considered to be unrelated to the deviation at any other point in the detector function (i.e. there is no covariance between the different time intervals). Therefore, the covariance matrix $\Sigma$ can be reduced to a diagonal matrix containing the variance $\sigma^2$ for each point of the detector function along the leading (or main, major or principal) diagonal of the matrix. With the covariance matrix reduced to a diagonal matrix in this manner, a simplified calculation of the Mahalanobis distance d is then given by:

$$d = \sqrt{\sum_{i=1}^{n} \frac{(z_{ts,(i)} - z_{d,(i)})}{\sigma_{(i)}^2}}$$

There is an expected value of the Mahalanobis distance which corresponds to the value of d when the detector function and the window of the time series are aligned to within the estimated uncertainty. We can assume that the squared Mahalanobis distance follows a chi-squared $\chi^2$ distribution with n degrees of freedom, whereby n is the number of time intervals in the detector function (i.e. the window size). Accordingly, the squared Mahalanobis distance has an expected value of n:

$$\langle d^2 \rangle = \langle (z_{ts}-z_d)^T \Sigma^{-1} (z_{ts}-z_d) \rangle = n$$

Given that the expected value is known, this can be used as the basis for a threshold for determining whether the feature represented by the detector function is present in a particular window of the call frequency time series by determining whether the Mahalanobis distance between the detector function and that window is less than this expected value (since a lower distance indicates a closer match). Similarly, if the Mahalanobis distance is greater than this expected value it can be determined that the feature represented by the detector function is not present in that window. In some embodiments, the threshold may be adjusted away from the expected value to account for any inaccuracies in the detector function and/or covariance matrix $\Sigma$, which may not be an entirely true reflection of the true statistics of the call frequency time series (especially when built from an ensemble of features using hypothesis-led approach). For example, when a hypothesis-led approach is used to create the detector function and covariance matrix $\Sigma$, the threshold may be set higher than the expected value (since the true statistics of the time series may be expected to include more variance than the models from which they are generated, thereby yielding higher Mahalanobis distances (i.e. lower measures of similarity) even where the feature is present).

Generating the detector function and its covariance matrix $\Sigma$ based on instances of a particular feature (such as a ramp-up or ramp-down transition) occurring in real data, can provide a more accurate reflection of the true statistics of the call frequency time series. In particular, this approach may additionally capture any covariance that may exist between each point in the detector function and the other points in the window of the call frequency time series (in addition to the variance between each point in the detector function and the corresponding point in the window of the call frequency time series). This means that the expectation of the square of the Mahalanobis distance $d^2$ may more closely correspond to the expected $\chi^2$ distribution where a good statistical fit is observed between the detector function and a window of the time series. However, the advantage of the hypothesis led approach is that it can be used on unlabelled data whereas defining the covariance using the call frequency time series data itself (i.e. using real call data) requires labelling of the data beforehand.

Figure 5A:
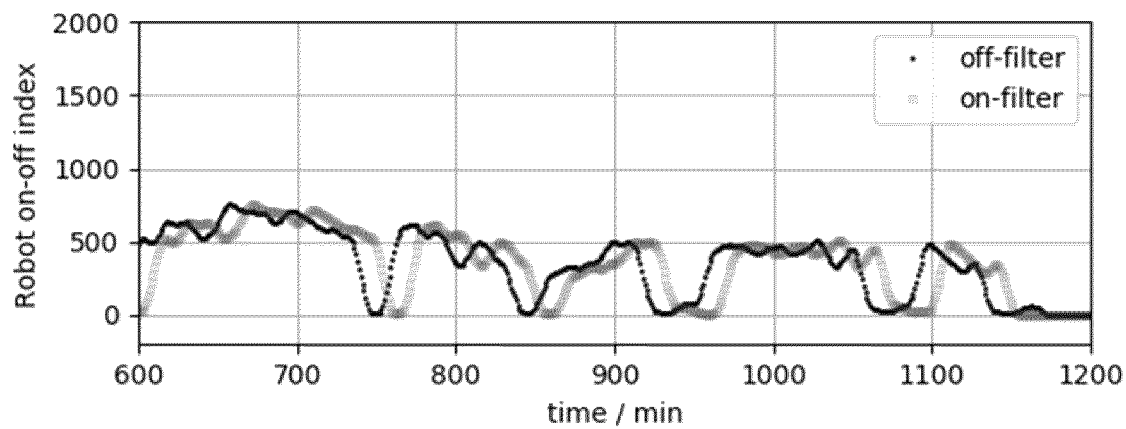
FIG. 5A shows the Mahalanobis distances calculated using the detector functions illustrated in FIGS. 4A and 4B as part of a sliding window detector over the call frequency time series illustrated in FIG. 3A.
Figure 5B:
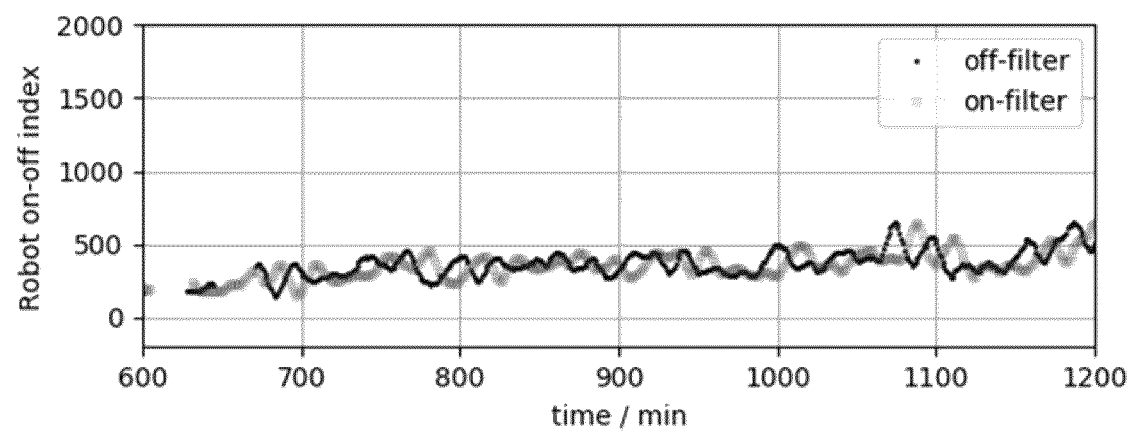
FIG. 5B shows the Mahalanobis distances calculated using the detector functions illustrated in FIGS. 4A and 4B as part of a sliding window detector over the call frequency time series illustrated in FIG. 3B.

FIGS. 5A and 5B show the Mahalanobis distances calculated using the detector functions illustrated in FIGS. 4A and 4B as part of a sliding window detector over the call frequency time series illustrated in FIGS. 3A and 3B respectively. In these charts, the Mahalanobis distance calculated by an on-detector (or on-filter), that is to say, where the detector function represents a ramp-up transition, is shown by the darker line. The lighter line represents the Mahalanobis distance calculated by an off-detector (or off-filter), that is to say, where the detector function represents a ramp-down transition. The lower the Mahalanobis distance, the higher the measure of similarity between a window of the time series at that point in time and the detector function. As can be seen in FIG. 5A, the points in time at which the plots for each detector function are approximately 0 correspond to the points in time that the corresponding features that they are detecting (either the ramp-up or ramp-down transitions) exist in the call frequency time series. Similarly, in FIG. 5B, where none of the features indicative of a computer dialler are present, the Mahalanobis distance for each detector doesn't drop below a particular value and does not approach 0.

The Mahalanobis distance provides a useful way of generating a measure of similarity to the detector function, particularly due to its ability to account for the uncertainty at different points in the detector function. However, other methods of generating a measure of similarity, as will be known by the skilled person, may be used instead.

In an embodiment, the highest measure of similarity (e.g. the lowest Mahalanobis distance) may be used to classify the calls. If the highest measure is below a particular threshold (such as the expected value of Mahalanobis distance given the window size), this indicates the presence of at least one feature which is indicative a computer dialler in action. As discussed above, computer diallers typically cycle through the various periods of behaviour multiple times throughout the course of a day. Therefore, in an alternative embodiment, the classification may be based on an average of any measures of similarity which are higher than a predetermined threshold. This predetermined threshold may be set relatively low. This means that features in the time series that only loosely match the detector function(s) may be included in the average value. Therefore, the average value can provide a measure as to how closely the features in the time series as a whole (or at least for a time period under consideration) match the features that are indicative of a computer dialler. As a result, the higher this average (in embodiments where a higher value for the measure of similarity indicates a closer match), the more likely that a computer dialler is in operation. Of course, it will be appreciated that in other embodiments where a measure of similarity which provides a lower value to indicate a closer match (such as the Mahalanobis distance) the average may be taken for windows having a measure of similarity below a predetermined threshold (which may be set relatively high) and a lower average value indicates that it is more likely that a computer dialler is in operation.

The calculated series of measures of similarity, such as the Mahalanobis distances, can also be used to detect the individual instances of the transitions in the call frequency time series. These are indicated by the measure of similarity being relatively high (e.g. where the Mahalanobis distance is relatively low). Accordingly, the times of such transitions can be determined based on the calculated measures of similarity. As an example, in an embodiment, a transition may be identified where the Mahalanobis distance drops below 200 (although other thresholds could be used instead). In order to prevent the same transition being identified multiple times (as separate transitions), the identification of transitions may, in some embodiments, further require that no additional transitions can be identified within a certain period of time (e.g. 20 minutes) of a transition that has already been identified.

Having classified the calls at operation 230 based on the features of the call frequency time series, the method 200 proceeds to an operation 240.

At operation 240, the method 200 routes further calls from the set of numbers in accordance with the classification. That is to say, it configures the network 100 to route calls from those numbers based on the classification. For example, the network 100 may maintain an 'automated caller list' containing the telephone numbers which are believed to be operating computer diallers to make unwanted automated calls. This list may be consulted when routing calls. Accordingly, adding a telephone number to the 'automated caller list' may cause further calls from that telephone number to be handled differently by the network 100. If the calls were not classified as including unwanted calls, further calls from that set of numbers will be processed as normal, for example, by delivering any further calls to the called number.

If a particular telephone number is added to the 'automated caller list' then the owner of that number may be informed by the network operator. The network operator may provide a mechanism by which such numbers can be removed from the 'automated caller list'. The entities which make large numbers of unwanted robot calls typically lease telephone numbers from third party brokers and thus are likely to move from number to number as they are added to the 'automated caller list'.

In some embodiments, if the calls were classified as including automated calls, the method 200 may, for example, configure the network 100 to deliver any further calls from those numbers to a voicemail server so that customers are not disturbed by those calls. Where an 'automated caller list' is used, future calls from numbers added to the 'automated caller list' may be redirected to voicemail. If a call is routed to the voicemail server then a notification will then be sent to the customer informing them that a calling party attempted to make an automated call to them. For example, the customer may be sent an email indicating that an automated call has been received, with a hyperlink which can be activated in order to allow the customer to access the contents of the robot call as and when they wish to do so, a notification may be sent to a computer or smartphone app, an SMS message may be sent, etc. Of course, it will be appreciated that any other suitable method of handling further calls from the set of numbers making unwanted automated calls may be used. As a further example, calls from such numbers could simply be blocked instead.

In some embodiments, the communication network may comprise a call management device which is configured to obtain a classification of one or more lines as carrying automated call attempts in the manner discussed above. That is to say, the classification being derived in dependence upon a call frequency time series representative of a variation in the frequency of calls made from the set of one or more lines. The call management device then acts within the network to prevent future call attempts from the lines from being routed to their indicated destinations.

Having configured the network 100 to route further calls from the set of telephone numbers based on the classification of the plurality of calls from those numbers, the method 200 ends. However, it will be appreciated that the method may be re-iterated to classify calls from a different set of numbers. Even though the method 200 ends, it will be appreciated that the routing for calls from the set of numbers as configured in operation 240 may continue to have effect.

It will be understood that the present invention relates to a method of classifying a source of telephone calls to determine whether they can be classified as automated calls or non-automated calls (that is whether they were made by a computer dialler or human-generated). It will be further understood that exact details of how these calls are then processed are not directly relevant to the present invention and that alternative schemes to those outlined above may be used. Some large users of the telephony network (banks, government agencies, etc.) will make many calls each day but that these calls will be in the main non-automated calls or will be a source of legitimate automated calls. As discussed above, the network operator may establish a whitelist of telephone numbers used by such entities which will be generating large numbers of calls. Telephone numbers on this whitelist will not be analysed in accordance with the method described above.

The method described above requires a call data source which comprises the telephone number used by the calling party, the telephone number of the called party and a time associated with the call (whether a start time or an end time or both). It will be understood that this data could be created solely for the purpose of implementing the method according to the present invention, but it is preferred that an existing source of data can be re-used. For example, the billing data which is created for each telephone call could be used. To simplify processing, additional data which is held in the billing data may be removed before it is made available to the call analyst terminal.

The foregoing discussion has been focused on the use of the present invention to detect and then re-route, unwanted robot calls in a conventional PSTN network. It will be understood that the present invention could also be used to detect unwanted robot calls made using IP-based voice services, for example Voice over IP calls. In this case the call data source will comprise a unique identifier of the calling party which may comprise an email address, a SIP address, a conventional telephone number or other unique identifier. Similarly, the call data source may comprise a unique identifier for the called party, which again may comprise an email address, a SIP address, a conventional telephone number or other unique identifier.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

In summary, the above disclosure provides a mechanism that allows automated calls made from a set of one or more numbers to be detected and routed in an appropriate manner. The calls are classified based, at least in part, on one or more features of a call frequency time series that is generated from data representing a plurality of calls previously made from a set of one or more numbers by determining a respective number of calls made by the set of numbers during each of a plurality of time intervals. The classification indicates whether the calls include automated calls. Further calls from the set of numbers are routed in accordance with the classification.

The invention claimed is:

1. A method of routing calls in a communications network, the method comprising:
   obtaining data representing a plurality of calls previously made from a set of one or more numbers;
   generating a call frequency time series for the set of numbers from the data by determining a respective number of calls made from the set of numbers during each of a plurality of time intervals;
   classifying the plurality of calls based, at least in part, on one or more features of the call frequency time series, wherein the one or more features are derived from one or more characteristic variations in call frequency over time and the classification indicates whether the plurality of calls from the set of numbers includes automated calls; and
   routing further calls from the set of numbers in accordance with the classification of the plurality of calls, wherein the one or more features comprise one, or both, of:
   transitions from quiet periods to busy periods; and
   transitions from busy periods to quiet periods,
   wherein the average number of calls during time intervals within a quiet period is lower than an average number of calls during time intervals within a busy period, and wherein the classification is based, at least in part, on the durations of the transitions.

2. The method of claim 1, wherein the set of numbers comprises a plurality of numbers.

3. The method of claim 1, further comprising:
using a sliding window detector to generate a respective measure of similarity between each of a plurality of windowed portions of the call frequency time series and one or more detector functions representing the one or more features.

4. The method of claim 3, wherein the measure of similarity comprises the Mahalanobis distance, wherein a low Mahalanobis distance indicates a high measure of similarity and a high Mahalanobis distance indicates a low measure of similarity.

5. The method of claim 3, wherein the one or more detector functions comprise one or both of:
a step function which transitions from a low state to a high state, the step function representing a transition from a quiet period to a busy period; and
a step function which transitions from a high state to a low state, the step function representing a transition from a busy period to a quiet period.

6. The method of claim 3, wherein the classification of the plurality of calls is based, at least in part, on an average of the respective measures of similarity for any windows having a measure of similarity that is higher than a predetermined threshold.

7. The method of claim 6, wherein classifying the plurality of calls comprises classifying the plurality of calls as automated calls if the average is above a predetermined threshold.

8. The method of claim 1, further comprising:
determining a number of occurrences of the one or more features in the call frequency time series during a predetermined time period,
wherein the classification is based, at least in part, on the number of occurrences of the one or more features.

9. The method of claim 1, further comprising:
identifying a respective time associated with each occurrence of the one or more features,
wherein the classification is based, at least in part, on the times at which the one or more features of the call frequency time series occurred.

10. The method of claim 1, wherein muting further calls from the set of numbers in accordance with the classification of the plurality of calls comprises:
delivering the further calls to a voicemail server if the plurality of calls are classified as automated calls; and
delivering the further calls to the original called number if the plurality of calls are not classified as automated calls.

11. A non-transitory computer-readable medium storing a computer program which, when executed by one or more processors, is arranged to carry out a method according to claim 1.

12. A computer system comprising a processor and a memory storing computer program code for performing a muting of calls in a communications network such that the computer system is at least configured to:
obtain data representing a plurality of calls previously made from a set of one or more numbers;
generate a call frequency time series for the set of numbers from the data by determining a respective number of calls made from the set of numbers during each of a plurality of time intervals;
classify the plurality of calls based, at least in part, on one or more features of the call frequency time series, wherein the one or more features are derived from one or more characteristic variations in call frequency over time and the classification indicates whether the plurality of calls from the set of numbers includes automated calls; and
route further calls from the set of numbers in accordance with the classification of the plurality of calls,
wherein the one or more features comprise one, or both, of:
transitions from quiet periods to busy periods; and
transition from busy periods to quiet periods,
wherein an average number of calls during time intervals within a quiet period is lower than an average number of calls during time intervals within a busy period, and wherein the classification is based, at least in part, on the durations of the transitions.

13. A call management device for use in a communications network, the call management device being configured to:
obtain a classification of one or more lines as carrying automated call attempts; and
prevent a call attempt received on one of the one or more lines from being routed to a destination indicated by the call attempt;
wherein the classification is derived in dependence upon a call frequency time series representative of a variation in the frequency of calls made from the set of one or more lines, and wherein the one or more features are derived from one or more characteristic variations in call frequency over time, and
wherein the one or more features comprise one, or both, of: transitions from quiet periods to busy periods; and transitions from busy periods to quiet periods, wherein an average number of calls during time intervals within a quiet period is lower than an average number of calls during time intervals within a busy period, and wherein the classification is based, at least in part, on the durations of transitions.

14. A method of routing calls in a communications network, the method comprising:
obtaining data representing a plurality of calls previously made from a set of one or more numbers;
generating a call frequency time series for the set of numbers from the data by determining a respective number of calls made from the set of numbers during each of a plurality of time intervals;
classifying the plurality of calls based, at least in part, on one or more features of the call frequency time series, wherein the one or more features are derived from one or more characteristic variations in call frequency over time and the classification indicates whether the plurality of calls from the set of numbers includes automated calls; and
routing further calls from the set of numbers in accordance with the classification of the plurality of calls,
wherein the classification of the plurality of calls is based, at least in part, on an average of respective measures of similarity for any of a plurality of windowed portions of the call frequency time series having a measure of similarity that is higher than a predetermined threshold.

15. A computer system comprising a processor and a memory storing computer program code for performing a routing of calls in a communications network such that the computer system is at least configured to:
obtain data representing a plurality of calls previously made from a set of one or more numbers;
generate a call frequency time series for the set of numbers from the data by determining a respective number of calls made from the set of numbers during each of a plurality of time intervals;

classify the plurality of calls based, at least in part, on one or more features of the call frequency time series, wherein the one or more features are derived from one or more characteristic variations in call frequency over time and the classification indicates whether the plurality of calls from the set of numbers includes automated calls; and route further calls from the set of numbers in accordance with the classification of the plurality of calls;

wherein the classification of the plurality of calls is based, at least in part, on an average of respective measures of similarity for any of a plurality of windowed portions of the call frequency time series having a measure of similarity that is higher than a predetermined threshold.

16. A method of routing calls in a communications network, the method comprising:

obtaining data representing a plurality of calls previously made from a set of one or more numbers;

generating a call frequency time series for the set of numbers from the data by determining a respective number of calls made from the set of numbers during each of a plurality of time intervals;

classifying the plurality of calls based, at least in part, on one or more features of the call frequency time series, wherein the one or more features are derived from one or more characteristic variations in call frequency over time and the classification indicates whether the plurality of calls from the set of numbers includes automated calls;

routing further calls from the set of numbers in accordance with the classification of the plurality of calls, and filtering the generated call frequency time series using a low pass filter prior to classifying the plurality of calls based, at least in part, on the one or more features of the call frequency time series.

17. A computer system comprising a processor and a memory storing computer program code for performing a routing of calls in a communications network such that the computer system is at least configured to:

obtain data representing a plurality of calls previously made from a set of one or more numbers;

generate a call frequency time series for the set of numbers from the data by determining a respective number of calls made from the set of numbers during each of a plurality of time intervals;

classify the plurality of calls based, at least in part, on one or more features of the call frequency time series, wherein the one or more features are derived from one or more characteristic variations in call frequency over time and the classification indicates whether the plurality of calls from the set of numbers includes automated calls; and route further calls from the set of numbers in accordance with the classification of the plurality of calls;

wherein the computer system is further configured to filter the generated call frequency time series using a low pass filter prior to classifying the plurality of calls based, at least in part, on the one or more features of the call frequency time series.

* * * * *